( 12 ) United States Patent
Underkoffler et al.

(10) Patent No.: US 8,830,168 B2
(45) Date of Patent: *Sep. 9, 2014

(54) SYSTEM AND METHOD FOR GESTURE BASED CONTROL SYSTEM

(75) Inventors: John S. Underkoffler, Los Angeles, CA (US); Kevin T. Parent, Santa Barbara, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 12/572,698

(22) Filed: Oct. 2, 2009

(65) Prior Publication Data

US 2010/0090947 A1 Apr. 15, 2010

Related U.S. Application Data

(63) Continuation of application No. 11/350,697, filed on Feb. 8, 2006, now Pat. No. 7,598,942.

(51) Int. Cl.
*G09G 5/08* (2006.01)

(52) U.S. Cl.
USPC .......................................... 345/158; 345/166

(58) Field of Classification Search
USPC ........................... 345/156–178; 715/856–864
See application file for complete search history.

(56) References Cited

U.S. PATENT DOCUMENTS

| 5,594,469 | A   | * | 1/1997  | Freeman et al. ............... 345/158 |
| 6,191,773 | B1  | * | 2/2001  | Maruno et al. ................ 345/158 |
| 6,222,465 | B1  | * | 4/2001  | Kumar et al. .................... 341/20 |
| 7,109,970 | B1  | * | 9/2006  | Miller ............................ 345/156 |
| 7,598,942 | B2  | * | 10/2009 | Underkoffler et al. ......... 345/158 |
| 8,370,383 | B2  | * | 2/2013  | Kramer et al. ................. 707/769 |
| 2004/0193413 | A1 | * | 9/2004  | Wilson et al. ................. 704/243 |
| 2005/0006154 | A1 | * | 1/2005  | Back et al. ........................ 178/1 |

\* cited by examiner

*Primary Examiner* — Vijay Shankar
(74) *Attorney, Agent, or Firm* — Gregory & Sawrie LLP

(57) ABSTRACT

The system provides a gestural interface to various visually presented elements, presented on a display screen or screens. A gestural vocabulary includes 'instantaneous' commands, in which forming one or both hands into the appropriate 'pose' results in an immediate, one-time action; and 'spatial' commands, in which the operator either refers directly to elements on the screen by way of literal 'pointing' gestures or performs navigational maneuvers by way of relative or "offset" gestures. The system contemplates the ability to identify the users hands in the form of a glove or gloves with certain indicia provided thereon, or any suitable means for providing recognizable indicia on a user's hands or body parts. A system of cameras can detect the position, orientation, and movement of the user's hands and translate that information into executable commands.

107 Claims, 7 Drawing Sheets

1. Depict pose with left hand as viewed from back

| | |
|---|---|
| p = | pinkie finger |
| r = | ring finger |
| m = | middle finger |
| i = | index finger |
| t = | thumb |

| | |
|---|---|
| ^ | = curled non-thumb |
| > | = curled thumb |
| \| | = straight finger or thumb pointed straight up |
| \ or / | = straight finger or thumb pointed at angle |
| - | = thumb pointing straight sideways |
| x | = finger or thumb pointing into plane |

| Pose name | p | r | m | i | t |
|---:|:---:|:---:|:---:|:---:|:---:|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x-y-z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG.3

2. Add hand orientation to complete pose must specify two variables:
    1. palm direction (if hand were flat)
    2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x-y-z start position |
| ^ ^ \ / > : * v | = | upside-down v |

FIG.4

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG.5

4. Orientation blends
    Achieve variable blending by enclosing pairs
    e.g.:

| | | | | : (vx) (x^)         flat at 45 degrees pitch toward screen

^ ^ | | > : ( - ( - v ) ) x    two-finger point rolled medially to 22.5
                                   degrees (halfway between palm medial
                                   and palm rolled to 45 degrees)

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^^\|\|:-x | drop thumb to select | | |
| 3 | move spatially / zoom in/out | ^^x\|-:-x | rotate/translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|:+x | sweep hand laterally | \|\|\|\|:-x | sweep hand medially |
| 7 | organize objects into a circle | ^^^\|-:-^ | look through circle of O.K. sign | | |
| 8 | two-finger point at objects | ^^\|-:-x | point | | |
| 9 | two-finger select object | ^^^\|\|:-x | drop thumb to select | | |
| 10 | mark start time | xxxxx:-^ | strike pose | | |
| 11 | mode change 1 | \|\|\|\|:-^ | strike pose - make "T" with two hands | \|\|\|\|:v- | strike pose - make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIG. 8/1

| # | Action | Notation | Description | Notation | Description |
|---|---|---|---|---|---|
| 14 | enter sub-application | \|\|\|\| : x ^ | strike pose | \|\|\|\| : x ^ | strike pose |
| 15 | return from sub-application | \|\|\|\| : . ^ | strike pose | \|\|\|\| : . ^ | strike pose |
| 16 | select option | ^^^^ \| - : - x | medial roll | | |
| 17 | roll time forward/back | \|\|\|\| : v x | Yaw hand at elbow while keeping hand parallel to floor | | |
| 18 | stop time | \|\|\|\| : x ^ | strike pose | | |
| 19 | loop time | ^^^^ \| - : x ^ | circular motion with "L" | | |
| 20 | demarcate irregular region | ^^^^ \| - : v x | start with 2 finger tips together. 1 hand holds start position. | ^^^ \| - : - x | other hand traces out shape - select "click" for vertices |
| 21 | tag object | \|^^^> : - x | pinky-point at object then roll hand medially | | |
| 22 | group data streams | ^^^ \| - : v x | bring finger tips of two hands together | ^^^ \| - : v x | bring finger tips of two hands together |
| 23 | restore encapsulated workspace | \|\|\|\| : + x | sweep hand medially | \|\|\|\| : - x | sweep hand laterally |

FIG.8/2

SYSTEM AND METHOD FOR GESTURE BASED CONTROL SYSTEM

This patent application is a continuation of U.S. patent application Ser. No. 11/350,697, filed Feb. 8, 2006, which is incorporated herein in its entirety.

BACKGROUND OF THE INVENTION

1. Field of the Invention

This invention relates to the field of computer system in general and in particular to a system and method for a gesture based control system.

2. Background

A user may enter commands and interact with a computer system by manipulating data or images in a window on a display, or by selecting operations from a menu associated with the window or an associated program, using input devices such as a mouse, keyboard, joystick, cross-key, or the like. Such input devices may also operate as position translating devices, which can be used to position a graphical, on-screen pointer, such as a cursor. A cursor functions, for example, to indicate a character to be revised or to indicate a position where data is to be entered or an operation is to be performed. A cursor, in some form or appearance, is typically present on the computer display. Manipulation of an input device by a user will result in a corresponding movement of the cursor. Thus, for example, movement of a mouse or other input device results in movement of the cursor in the same direction.

A cursor may have different appearances depending on its function and the state of the computer system. For example, when positioned in a text field on a computer display, the cursor may have the appearance of an "I-beam", or a blinking vertical line. The position of the cursor in a text field indicates the location of the next character that will be entered by the user, typically via a keyboard. The cursor may have other appearances depending on its function. In a drawing or painting program, the cursor may be represented as a paint brush, pencil, eraser, bucket, or other graphic form.

The cursor may also take the shape of an arrow or pointer when positioned over user-selectable operations or when it is used to select graphical elements, such as windows. To select and activate a desired operation with the cursor, it may be positioned over a graphical or text representation of the operation. A button located on a mouse input device may be depressed and/or released to effectuate the operation. The user is notified of the acceptance of the operation for execution by visual feedback, usually in the form of some change in an image on the computer's display. One or more of the programs in use typically generates this visual response. These programs generate drawing commands to update the display images in response to the selected operations.

A disadvantage of prior art systems is that the input device is often just that, a device. The user is required to have a wired or wireless mouse or other input device and to use that device to manage selection, position translation, activation, and other input functions. Often the use of these physical devices is not natural or intuitive. Another disadvantage is the need to go through certain steps to change the context of the input device so that different functions may be performed.

With the popularity of very large displays, further disadvantages of prior art input devices and systems become apparent. When using a mouse for example, to attempt to translate the position of a cursor across a large display, the user must often lift the mouse and replace it on the mouse surface to enable the user to drag the cursor across even a portion of a large display. This is a wasted an unnatural motion.

There have been some prior art attempts to provide a solution to these problems. One prior art solution is the use of gloves on the users hand. These gloves deign to turn the users hand or hands into input devices. In one embodiment, an input glove is hard wired to a computer system. This solution has the disadvantage of literally tying the user to the spot, requiring a nearness to the computer system and a restriction on range of motion. In other cases, the gloves are wireless. However, such wireless implementations require an independent power supply for the glove. When the power supply needs to be recharged, the gloves may not be used.

SUMMARY OF THE INVENTION

The system provides a gestural interface to various visually presented elements, presented on a display screen or screens. The operator of the system navigates and manipulates these elements by issuing a continuous stream of 'gestural commands' using the operators hands in one embodiment. In other embodiments, a user's head, feet, arms, legs, or the whole user may be used to provide the navigation and control. The gestural vocabulary includes 'instantaneous' commands, in which forming one or both hands into the appropriate 'pose' results in an immediate, one-time action; and 'spatial' commands, in which the operator either refers directly to elements on the screen by way of literal 'pointing' gestures or performs navigational maneuvers by way of relative or "offset" gestures. In addition to pointing gestures, which are used for absolute or direct spatial gesturing, the invention may also recognize another category of relative spatial navigation gestures in an XYZ space. This category of actions is sometimes referred to as XYZ techniques. By maintaining a high frame rate, by guaranteeing a nearly imperceptible lag in the interpretation of operator gestures, and by employing both carefully designed spatial metaphors and readily evident 'direct manipulation' mechanism, the system provides a vivid 'cognitive coupling' between the operator and the information & processes being represented. The system contemplates the ability to identify the user's hands. This system of identification may be in the form of a glove or gloves with certain indicia provided thereon, or any suitable means for providing recognizable indicia on a user's hands. A system of cameras can detect the position, orientation, and movement of the user's hands and translate that information into executable commands.

BRIEF DESCRIPTION OF THE DRAWINGS

FIG. 3 is a diagram of poses in a gesture vocabulary in an embodiment of the invention.

FIG. 4 is a diagram of orientation in a gesture vocabulary in an embodiment of the invention.

FIG. 5 is a diagram of two hand combinations in a gesture vocabulary in an embodiment of the invention.

FIG. 8 is an example of commands in an embodiment of the system.

DETAILED DESCRIPTION OF THE PREFERRED EMBODIMENTS

A system and method for a gesture based control system is described. In the following description, a number of features are described in detail in order to provide a more thorough understanding of the invention. It is apparent that the invention may be practiced without out these specific details. In other cases, well known features have not been described in detail.

System

Figure 1:
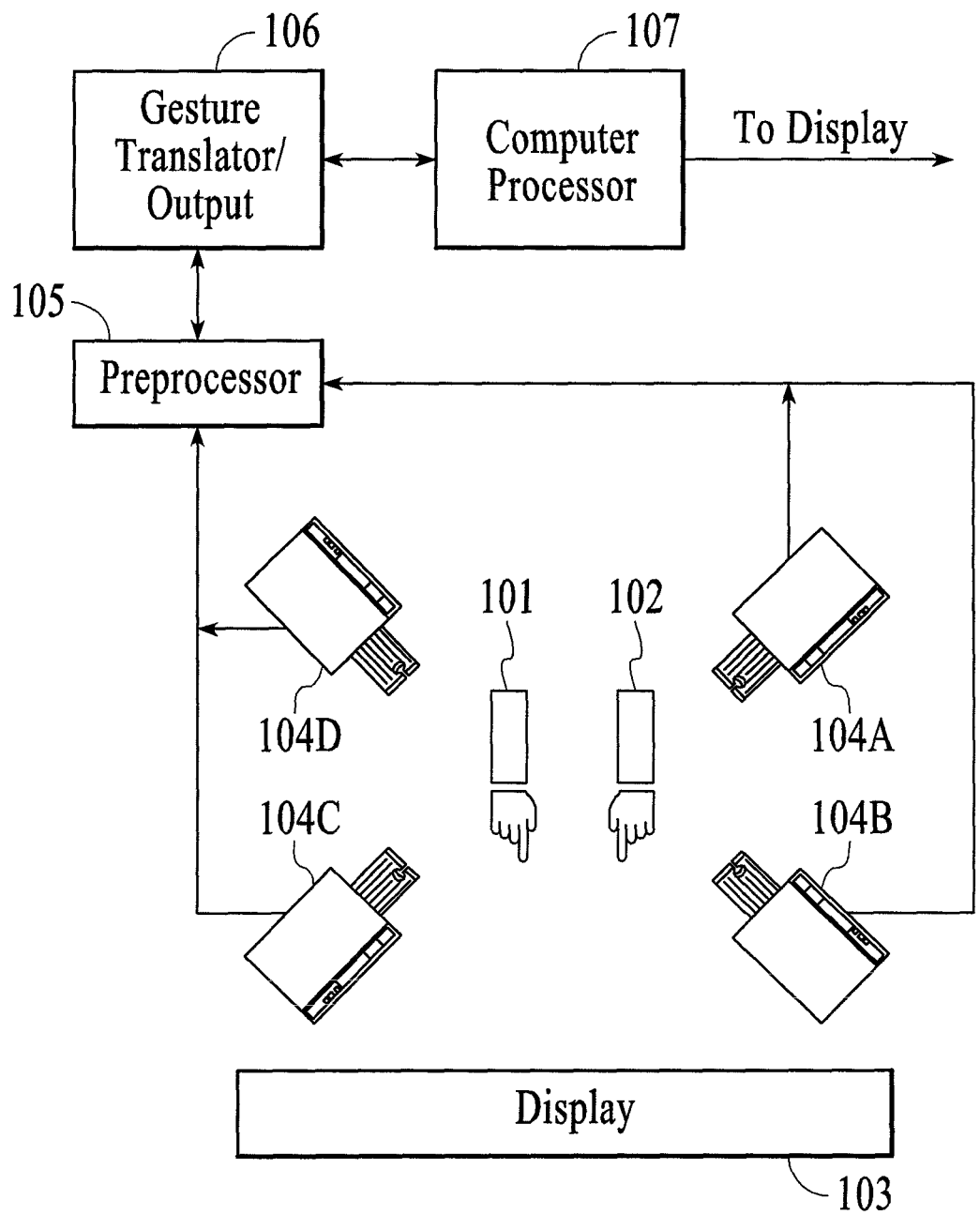
FIG. 1 is a diagram of an embodiment of the system of the invention.

A block diagram of an embodiment of the invention is illustrated in FIG. 1. A user locates his hands 101 and 102 in the viewing area of an array of cameras 104A-104D. The cameras detect location, orientation, and movement of the fingers and hands 101 and 102 and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103.

Although the system is shown with a, single user's hands as input, the invention may also be implemented using multiple users. In addition, instead of or in addition to hands, the system may track any part or parts of a user's body, including head, feet, legs, arms, elbows, knees, and the like.

In the embodiment shown, four cameras are used to detect the location, orientation, and movement of the user's hands 101 and 102. It should be understood that the invention may be used with more or fewer cameras without departing from the scope or spirit of the invention. In addition, although the cameras are disposed symmetrically in the example embodiment, there is no requirement of such symmetry in the invention. Any number or positioning of cameras that permits the location, orientation, and movement of the user's hands may be used in the invention.

In one embodiment of the invention, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are used for optical detection. In other embodiments, the cameras or other detectors may be used for electromagnetic, magnetostatic, RFID, or any other suitable type of detection.

Pre-processor 105 is used to generate three dimensional space point reconstruction and skeletal point labeling. The gesture translator 106 is used to convert the 3D spatial information and marker motion information into a command language that can be interpreted by a computer processor to update the location, shape, and action of a cursor on a display. In an alternate embodiment of the invention, the pre-processor 105 and gesture translator 106 can be combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

The invention contemplates the use of marker tags on one or more fingers of the user so that the system can locate the hands of the user, identify whether it is viewing a left or right hand, and which fingers are visible. This permits the system to detect the location, orientation, and movement of the users hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labelling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 2.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 2:
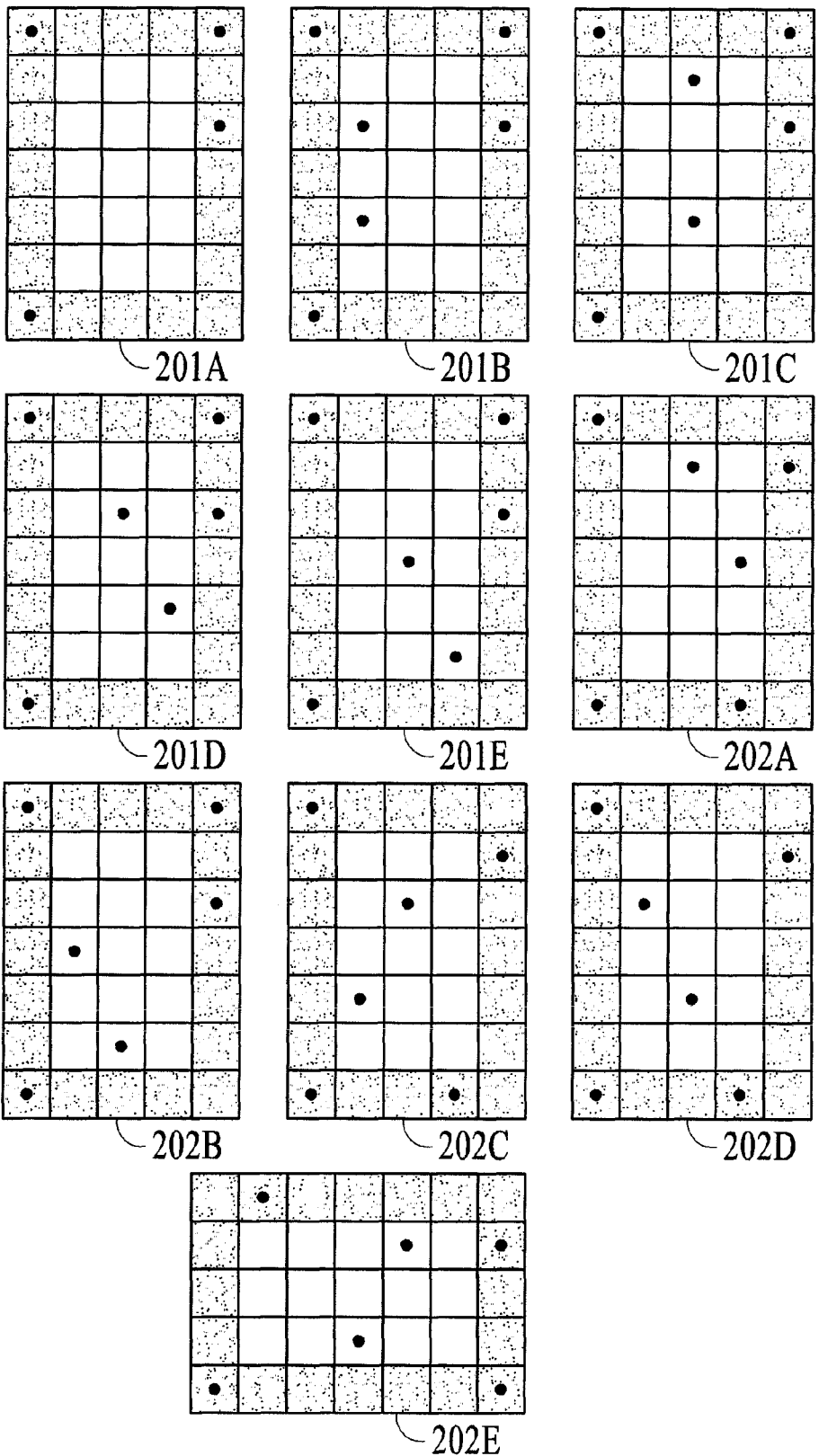
FIG. 2 is a diagram of an embodiment of marking tags of the invention.

Referring now to FIG. 2, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 2) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This sub-pattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three dimensionality of the markers can be an aid in detection and location over two dimensional markers. However either can be used without departing from the spirit and scope of the present invention.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'—individual markers directly onto the operator's fingers and hands.

Gesture Vocabulary

The invention contemplates a gesture vocabulary consisting of hand poses, orientation, hand combinations, and orientation blends. A notation language is also implemented for designing and communicating poses and gestures in the gesture vocabulary of the invention. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the invention establishes for any specific linkage a constant length string; the aggregate of the specific ASCII characters occupying the string's 'character locations' is then a unique description of the instantaneous state, or 'pose', of the linkage.

Hand Poses

FIG. 3 illustrates hand poses in an embodiment of a gesture vocabulary using the invention. The invention supposes that each of the five fingers on a hand are used. These fingers are codes as p-pinkie, r-ring finger, m-middle finger, i-index finger, and t-thumb. A number of poses for the fingers and thumbs are defined and illustrated in FIG. 3. A gesture vocabulary string establishes a single character position for each expressible degree of freedom in the of the linkage (in this case, a finger). Further; each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Still referring to FIG. 3, a number of poses are defined and identified using ASCII characters. Some of the poses are divided between thumb and non-thumb. The invention in this embodiment uses a coding such that the ASCII character itself is suggestive of the pose. However, any character may used to represent a pose, whether suggestive or not. In addition, there is no requirement in the invention to use ASCII characters for the notation strings. Any suitable symbol, numeral, or other representation maybe used without departing from the scope and spirit of the invention. For example, the notation may use two bits per finger if desired or some other number of bits as desired.

A curled finger is represented by the character "^" while a curled thumb by ">". A straight finger or thumb pointing up is indicated by "l" and at an angle by "\" or "/". "-" represents a thumb pointing straight sideways and "x" represents a thumb pointing into the plane.

Using these individual finger and thumb descriptions, a robust number of hand poses can be defined and written using the scheme of the invention. Each pose is represented by five characters with the order being p-r-m-i-t as described above. FIG. 3 illustrates a number of poses and a few are described here by way of illustration and example. The hand held flat and parallel to the ground is represented by "11111". A fist is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 4 illustrates hand orientation descriptors and examples of coding that combines pose and orientation. In an embodiment of the invention, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of and embodiment of the invention, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion, within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:
[|||||: vx] is a flat hand (thumb parallel to fingers) with palm facing down and fingers forward.
[|||||: x^] is a flat hand with palm facing forward and fingers toward ceiling
[|||||: -x] is a flat hand with palm facing toward the center of the body (right if left hand, left if right hand) and fingers forward
[^^^^: -x] is a single-hand thumbs-up (with thumb pointing toward ceiling)
[^^^|-: -x] is a mime gun pointing forward

Two Hand Combination

The present invention contemplates single hand commands and poses, as well as two-handed commands and poses. FIG. 5 illustrates examples of two hand combinations and associated notation in an embodiment of the invention. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 6, 7:
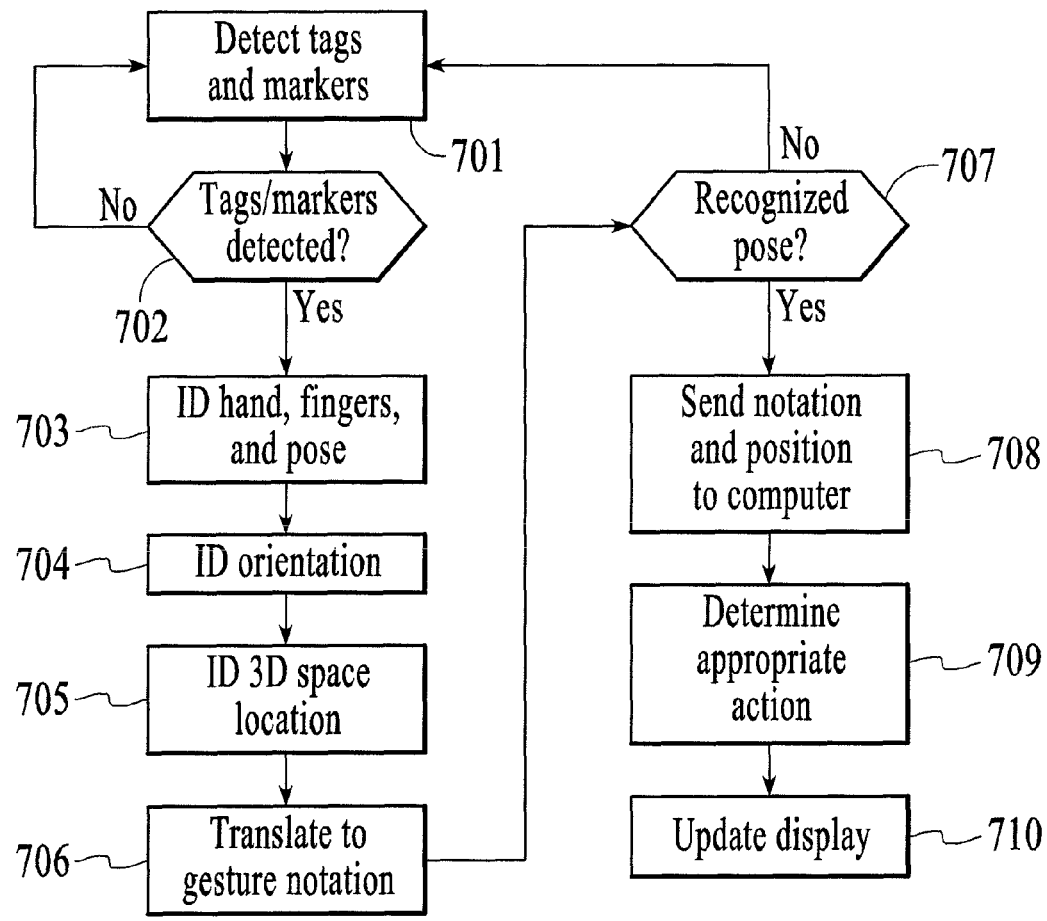
FIG. 6 is a diagram of orientation blends in a gesture vocabulary in an embodiment of the invention.
FIG. 7 is a flow diagram illustrating the operation an embodiment of the system of the invention.

FIG. 6 illustrates an example of an orientation blend in an embodiment of the invention. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends are contemplated in the invention.

Example Commands

FIG. 8 illustrates a number of possible commands that may be used with the present invention. Although some of the discussion here has been about controlling a cursor on a display, the invention is not limited to that activity. In fact, the invention has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The invention may also be used in lieu of menu commands such as open, close, save, and the like. In other words, any commands or activity that can be imagined can be implemented with hand gestures.

Operation

FIG. 7 is a flow diagram illustrating the operation of the invention in one embodiment. At step 701 the detection system detects the markers and tags. At decision block 702 it is determined if the tags and markers are detected. If not, the system returns to step 701. If the tags and markers are detected at step 702, the system proceeds to step 703. At step 703 the system identifies the hand, fingers and pose from the detected tags and markers. At steps 704 the system identifies the orientation of the pose. At step 705 the system identifies the three dimensional spatial location of the hand or hands that are detected. (Please note that any or all of steps 703, 704, and 705 may be combined as a single step).

At step 706 the information is translated to the gesture notation described above. At decision block 707 it is determined if the pose is valid. This may be accomplished via a simple string comparison using the generated notation string. If the pose is not valid, the system returns to step 701. If the pose is valid, the system sends the notation and position information to the computer at step 708. At step 709 the computer determines the appropriate action to take in response to the gesture and updates the display accordingly at step 710.

In one embodiment of the invention, steps 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment consists of:

1) a compact and efficient way to specify (encode for use in computer programs) gestures at several different levels of aggregation:
   a. a single hand's "pose" (the configuration and orientation of the parts of the hand relative to one another) a single hand's orientation and position in three-dimensional space
   b. two-handed combinations, for either hand taking into account pose, position or both
   c. multi-person combinations; the system can track more than two hands, and so more than one person can cooperatively (or competitively, in the case of game applications) control the target system
   d. sequential gestures in which poses are combined in a series; we call these "animating" gestures
   e. "grapheme" gestures, in which the operator traces shapes in space 2) a programmatic technique for registering specific gestures from each category above that are relevant to a given application context 3) algorithms for parsing the gesture stream so that registered gestures can be identified and events encapsulating those gestures can be delivered to relevant application contexts The specification system (1), with constituent elements (1a) to (1f), provides the basis for making use of the gestural parsing and translating capabilities of the system described here.

A single-hand "pose" is represented as a string of
   i) relative orientations between the fingers and the back of the hand,
   ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to i) build complex contextual and conditional control states, ii) to dynamically add hysteresis to the control environment, and iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include i) "entry" state notifiers and "continuation" state notifiers, and ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbitrarily large architectural environment, and multiple screens is nontrivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Thus, a gesture based control system has been described.

What is claimed is:

1. A method of controlling a computer display comprising:
detecting a physical control gesture made by a user by dynamically detecting a position of at least one marker on the user, the detecting comprising using gesture data that is absolute three-space location data of an instantaneous state of the user at a point in time and space, and identifying the physical control gesture using only the gesture data;
translating the control gesture to an executable command;
updating the computer display in response to the executable command.

2. A method comprising:
detecting poses and motion of an object from gesture data received via a detector, the detecting comprising dynamically detecting a position of at least one marker on the object using the gesture data that is absolute three-space location data of an instantaneous state of the poses and motion at a point in time and space, the detecting comprising identifying the poses and motion using only the gesture data;
translating the poses and motion into a control signal using a gesture notation; and
controlling a computer application using the control signal.

3. A method comprising:
automatically detecting a gesture of a body from gesture data received via a detector, the detecting comprising detecting a position of at least one marker on the body using the gesture data that is absolute three-space location data of an instantaneous state of the body at a point in time and space, the detecting comprising identifying the gesture using only the gesture data;
translating the gesture to a gesture signal; and
controlling a component coupled to a computer in response to the gesture signal.

4. The method of claim 3, wherein the detecting includes detecting a location of the body.

5. The method of claim 3, wherein the detecting includes detecting an orientation of the body.

6. The method of claim 3, wherein the detecting includes detecting motion of the body.

7. The method of claim 3, wherein the detecting comprises identifying the gesture, wherein the identifying includes identifying a pose and an orientation of a portion of the body.

8. The method of claim 3, wherein the detecting includes detecting at least one of a first set of appendages and a second set of appendages of the body.

9. The method of claim 8, wherein the body is a human, wherein the first set of appendages include at least one hand, wherein the second set of appendages include at least one finger of the at least one hand.

10. The method of claim 3, wherein the detecting includes optically detecting motion of the body.

11. The method of claim 3, wherein the at least one marker includes a set of markers.

12. The method of claim 11, wherein the detecting includes detecting position of the set of markers coupled to a part of the body.

13. The method of claim 11, wherein the set of markers form a plurality of patterns on the body.

14. The method of claim 11, wherein the detecting includes detecting position of a plurality of appendages of the body using the set of markers coupled to each of the appendages.

15. The method of claim 14, wherein a first set of markers is coupled to a first appendage, the first set of markers forming a first pattern common to a plurality of components of the first appendage and a second pattern unique to each of the components of the first appendage.

16. The method of claim 14, wherein a second set of markers is coupled to a second appendage, the second set of markers forming a third pattern common to a plurality of components of the second appendage and a fourth pattern unique to each of the components of the second appendage.

17. The method of claim 11, wherein the detecting comprises assigning a position of each marker to a subset of markers that form a tag.

18. The method of claim 17, wherein the detecting comprises identifying the subset of markers as a particular tag and labeling the subset of markers as the particular tag.

19. The method of claim 18, wherein the detecting comprises recovering a three-space location of the particular tag.

20. The method of claim 19, wherein the detecting comprises recovering a three-space orientation of the particular tag.

21. The method of claim 11, comprising a set of tags that include the set of markers.

22. The method of claim 21, wherein the detecting includes detecting position of the set of tags coupled to a part of the body.

23. The method of claim 22, wherein each tag of the set of tags includes a pattern, wherein the pattern comprises the set of markers, wherein each pattern of each tag of the set of tags is different than any pattern of any remaining tag of the set of tags.

24. The method of claim 23, wherein each tag includes a first pattern and a second pattern, wherein the first pattern is common to any tag of the set of tags and the second pattern is different between at least two tags of the set of tags.

25. The method of claim 22, wherein the set of tags form a plurality of patterns on the body.

26. The method of claim 21, wherein the detecting includes detecting position of a plurality of appendages of the body using the set of tags coupled to each of the appendages.

27. The method of claim 26, wherein a first set of tags is coupled to a first appendage, the first set of tags including a first plurality of tags, wherein each tag includes a first pattern common to the tags of the first plurality of tags and a second pattern unique to each tag of the first plurality of tags.

28. The method of claim 27, wherein a second set of tags is coupled to a second appendage, the second set of tags including a second plurality of tags, wherein each tag includes a third pattern common to the tags of the second plurality of tags and a fourth pattern unique to each tag of the second plurality of tags.

29. The method of claim 21, wherein the set of tags comprise at least one of an active tag and a passive tag.

30. The method of claim 21, wherein the detecting comprises assigning a position of each tag to a subset of points that form a single tag.

31. The method of claim 30, wherein the detecting comprises identifying the subset of points as a particular tag and labeling the subset of points as the particular tag.

32. The method of claim 31, wherein the detecting comprises recovering a three-space location of the particular tag.

33. The method of claim 32, wherein the detecting comprises recovering a three-space orientation of the particular tag.

34. The method of claim 3, wherein the detecting includes detecting motion of the body at least one of electromagnetic detection, magnetostatic detection, and detection of radio frequency identification information.

35. The method of claim 3, wherein the detecting comprises:
generating three-dimensional space point data representing the physical gesture;
labeling the space point data.

36. The method of claim 35, wherein the translating includes translating the space point data into commands appropriate to a configuration of the computer.

37. The method of claim 3, wherein the translating comprises translating information of the gesture to a gesture notation.

38. The method of claim 37, wherein the gesture notation represents a gesture vocabulary, and the gesture signal comprises communications of the gesture vocabulary.

39. The method of claim 38, wherein the gesture vocabulary represents in textual form instantaneous pose states of kinematic linkages of the body.

40. The method of claim 38, wherein the gesture vocabulary represents in textual form an orientation of kinematic linkages of the body.

41. The method of claim 38, wherein the gesture vocabulary represents in textual form a combination of orientations of kinematic linkages of the body.

42. The method of claim 38, wherein the gesture vocabulary includes a string of characters that represent a state of kinematic linkages of the body.

43. The method of claim 42, wherein the kinematic linkage is at least one first appendage of the body.

44. The method of claim 43, comprising assigning each position in the string to a second appendage, the second appendage connected to the first appendage.

45. The method of claim 44, comprising assigning characters of a plurality of characters to each of a plurality of positions of the second appendage.

46. The method of claim 45, wherein the plurality of positions is established relative to a coordinate origin.

47. The method of claim 46, comprising establishing the coordinate origin using a position selected from a group consisting of an absolute position and orientation in space, a fixed position and orientation relative to the body irrespective of an overall position and heading of the body, and interactively in response to an action of the body.

48. The method of claim 45, comprising assigning characters of the plurality of characters to each of a plurality of orientations of the first appendage.

49. The method of claim 43, wherein controlling the component comprises controlling a three-space object in six degrees of freedom simultaneously by mapping the gesture of the first appendage to the three-space object.

50. The method of claim 43, wherein controlling the component comprises controlling a three-space object through three translational degrees of freedom and three rotational degrees of freedom.

51. The method of claim 50, wherein the controlling comprises a direct coupling between motion of the first appendage and the three-space object.

52. The method of claim 50, wherein the controlling includes an indirect coupling between motion of the first appendage and the three-space object.

53. The method of claim 50, wherein the three-space object is presented on a display device coupled to the computer.

54. The method of claim 50, wherein the three-space object is coupled to the computer.

55. The method of claim 50, comprising controlling movement of the three-space object by mapping a plurality of gestures of the first appendage to a plurality of object translations of the three-space object.

56. The method of claim 55, wherein the mapping includes a direct mapping between the plurality of gestures and the plurality of object translations.

57. The method of claim 55, wherein the mapping includes an indirect mapping between the plurality of gestures and the plurality of object translations.

58. The method of claim 55, wherein the mapping includes correlating positional offsets of the plurality of gestures to positional offsets of the object translations of the three-space object.

59. The method of claim 55, wherein the mapping includes correlating positional offsets of the first appendage to translational velocity of the object translations of the three-space object.

60. The method of claim 50, comprising controlling movement of the three-space object by mapping a linear gesture of the first appendage to a linear translation of the three-space object.

61. The method of claim 50, comprising controlling movement of the three-space object by mapping a rotational gesture of the first appendage to a rotational translation of the three-space object.

62. The method of claim 50, comprising controlling movement of the three-space object by mapping a linear gesture of the first appendage to a rotational translation of the three-space object.

63. The method of claim 50, comprising controlling movement of the three-space object by mapping a rotational gesture of the first appendage to a linear translation of the three-space object.

64. The method of claim 50, comprising controlling movement of the three-space object along an x-axis using left-right movement of the first appendage.

65. The method of claim 50, comprising controlling movement of the three-space object along a y-axis using up-down movement of the first appendage.

66. The method of claim 50, comprising controlling movement of the three-space object along a z-axis using forward-backward movement of the first appendage.

67. The method of claim 50, comprising controlling movement of the three-space object simultaneously along an x-axis and a y-axis using a first combination of left-right movement and up-down movement of the first appendage.

68. The method of claim 50, comprising controlling movement of the three-space object simultaneously along an x-axis and a z-axis using a second combination of left-right movement and forward-backward movement of the first appendage.

69. The method of claim 50, comprising controlling movement of the three-space object simultaneously along a y-axis and a z-axis using a third combination of up-down movement and forward-backward movement of the first appendage.

70. The method of claim 50, comprising controlling movement of the three-space object simultaneously along an x-axis, a y-axis, and a z-axis using a fourth combination of left-right movement, up-down movement, and forward-backward movement of the first appendage.

71. The method of claim 50, comprising controlling roll of the three-space object around a first axis using a rotational movement of the first appendage.

72. The method of claim 50, comprising controlling roll of the three-space object around a second axis using a rotational movement of the first appendage about a first of the second appendages.

73. The method of claim 50, comprising controlling roll of the three-space object around a third axis using a rotational movement of the first appendage about a second of the second appendages.

74. The method of claim 50, wherein the detecting comprises detecting when an extrapolated position of the object intersects virtual space, wherein the virtual space comprises space depicted on a display device coupled to the computer.

75. The method of claim 74, wherein controlling the component comprises controlling a virtual object in the virtual space when the extrapolated position intersects the virtual object.

76. The method of claim 75, wherein controlling the component comprises controlling a position of the virtual object in the virtual space in response to the extrapolated position in the virtual space.

77. The method of claim 75, wherein controlling the component comprises controlling attitude of the virtual object in the virtual space in response to the gesture.

78. The method of claim 3, comprising specifying the gesture at a plurality of levels.

79. The method of claim 78, comprising partially specifying the gesture using a portion of information of the gesture.

80. The method of claim 78, wherein the plurality of levels include a first level comprising a pose of a first appendage of the body.

81. The method of claim 80, comprising representing the pose as a string of relative orientations between at least one second appendage and a back portion of a first appendage of the body, wherein the second appendage is connected to the first appendage.

82. The method of claim 81, comprising quantizing the string of relative orientations into at least one discrete state.

83. The method of claim 78, wherein the plurality of levels include a second level comprising a combination of poses, the combination of poses comprising a first pose of a first appendage and a second pose of a second appendage of the body.

84. The method of claim 83, wherein the second level comprises a combination of positions, the combination of positions comprising a first position of the first appendage and a second position of the second appendage.

85. The method of claim 78, wherein the plurality of levels include a third level comprising a combination of poses and positions, the combination of poses comprising a third pose of at least one appendage of the body and a fourth pose of at least one appendage of a second body.

86. The method of claim 85, wherein the third level comprises a combination of positions, the combination of positions comprising a third position of the at least one appendage of the body and a fourth position of the at least one appendage of the second body.

87. The method of claim 78, wherein the plurality of levels include a fourth level comprising at least one sequence of gestures.

88. The method of claim 78, wherein the plurality of levels include a fifth level comprising a grapheme gesture, wherein the grapheme gesture comprises the body tracing a shape in free space.

89. The method of claim 78, comprising generating a registered gesture by registering the gesture as relevant to at least one application, wherein the application is coupled to the computer.

90. The method of claim 89, comprising:
parsing the registered gesture;
identifying the registered gesture; and
transferring to the at least one application an event corresponding to the registered gesture.

91. The method of claim 90, comprising prioritizing the registered gesture.

92. The method of claim 91, comprising assigning a state to the registered gesture.

93. The method of claim 92, wherein the state is selected from a group consisting of an entry state and a continuation state, wherein a priority of the continuation state is higher than a priority of the entry state.

94. The method of claim 90, wherein the parsing comprises:
marking missing data components of the gesture;
interpolating the missing data components into one of last known states and most likely states, wherein the interpolating depends on an amount and context of the missing data.

95. The method of claim 94, wherein the identifying comprises using the last known state of the missing data components for the identifying when the last known state is available for analysis.

96. The method of claim 94, wherein the identifying comprises using a best guess of the missing data components for the identifying when the last known state is unavailable for analysis.

97. The method of claim 3, comprising controlling scaling of the detecting and controlling to generate coincidence between virtual space and physical space, wherein the virtual space comprises space depicted on a display device coupled to the computer, wherein the physical space comprises space inhabited by the body.

98. The method of claim 97, comprising determining dimensions, orientations, and positions in the physical space of the display device.

99. The method of claim 98, comprising dynamically mapping the physical space in which the display device is located as a projection into the virtual space of at least one application coupled to the computer.

100. The method of claim 97, comprising translating scale, angle, depth, and dimension between the virtual space and the physical space as appropriate to at least one application coupled to the computer.

101. The method of claim 97, comprising controlling at least one virtual object in the virtual space in response to movement of at least one physical object in the physical space.

102. The method of claim 97, comprising automatically compensating for movement of the display device.

103. The method of claim 97, comprising controlling rendering of graphics on the display device in response to position of the body in physical space relative to position of the display device.

104. The method of claim 97, comprising generating on the display device a display including a virtual version of a physical object present in the physical space, wherein generating the display includes generating coincidence between a virtual position of the virtual version of the physical object and the position of the physical object in the physical space.

105. The method of claim 3, comprising determining the gesture is valid.

106. The method of claim 3, wherein the controlling includes controlling a function of an application hosted on the computer.

107. The method of claim 3, wherein the controlling includes controlling a component displayed on the computer.

* * * * *